April 14, 1953 C. A. JOHNSON 2,634,611
ATTACHMENT FOR VASCULAR RECORDING APPARATUS
Filed May 21, 1949 2 SHEETS—SHEET 1
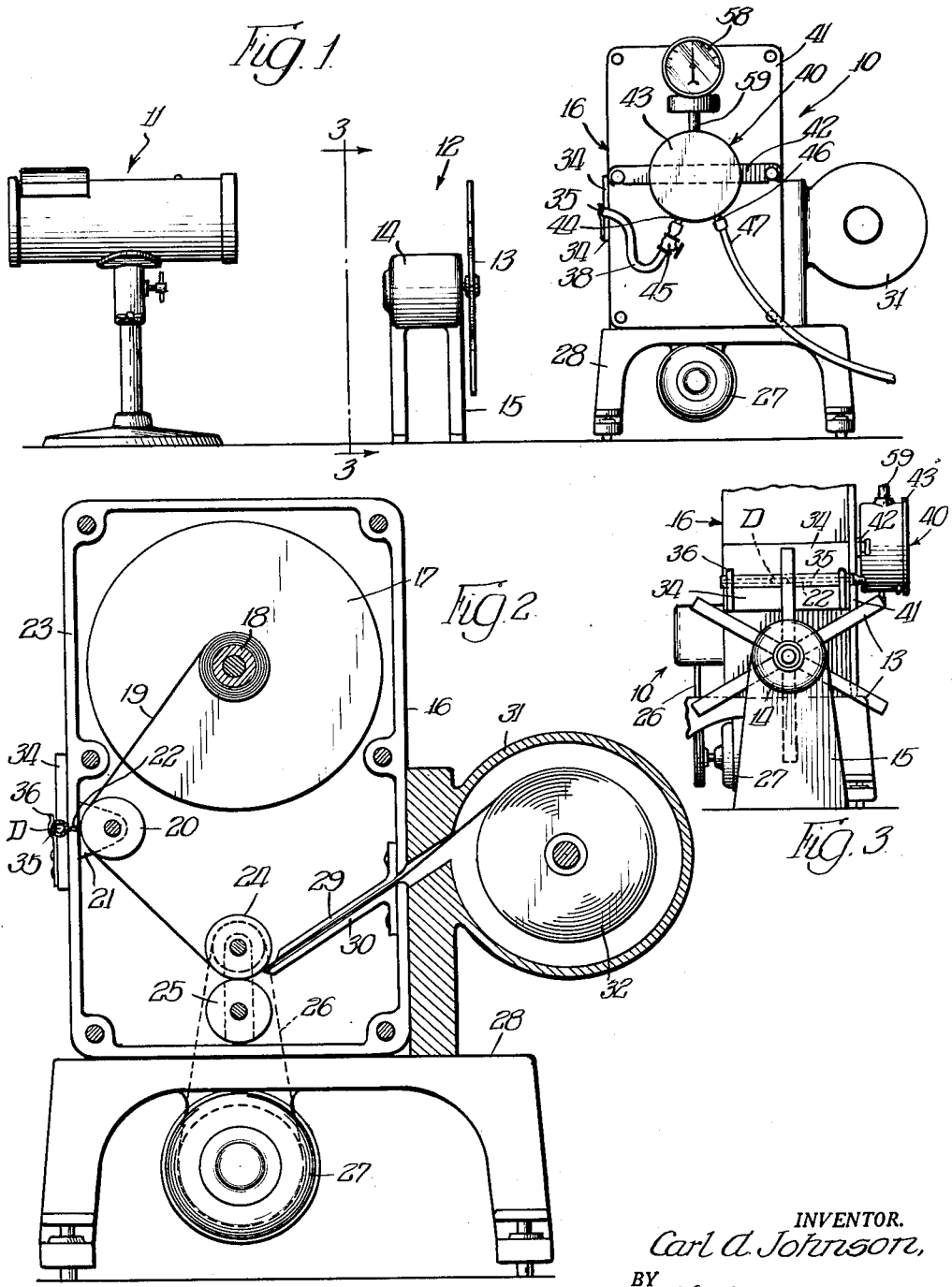
INVENTOR.
Carl A. Johnson,
BY
Cromwell, Greist & Warden
Attys.

April 14, 1953   C. A. JOHNSON   2,634,611
ATTACHMENT FOR VASCULAR RECORDING APPARATUS
Filed May 21, 1949   2 SHEETS—SHEET 2
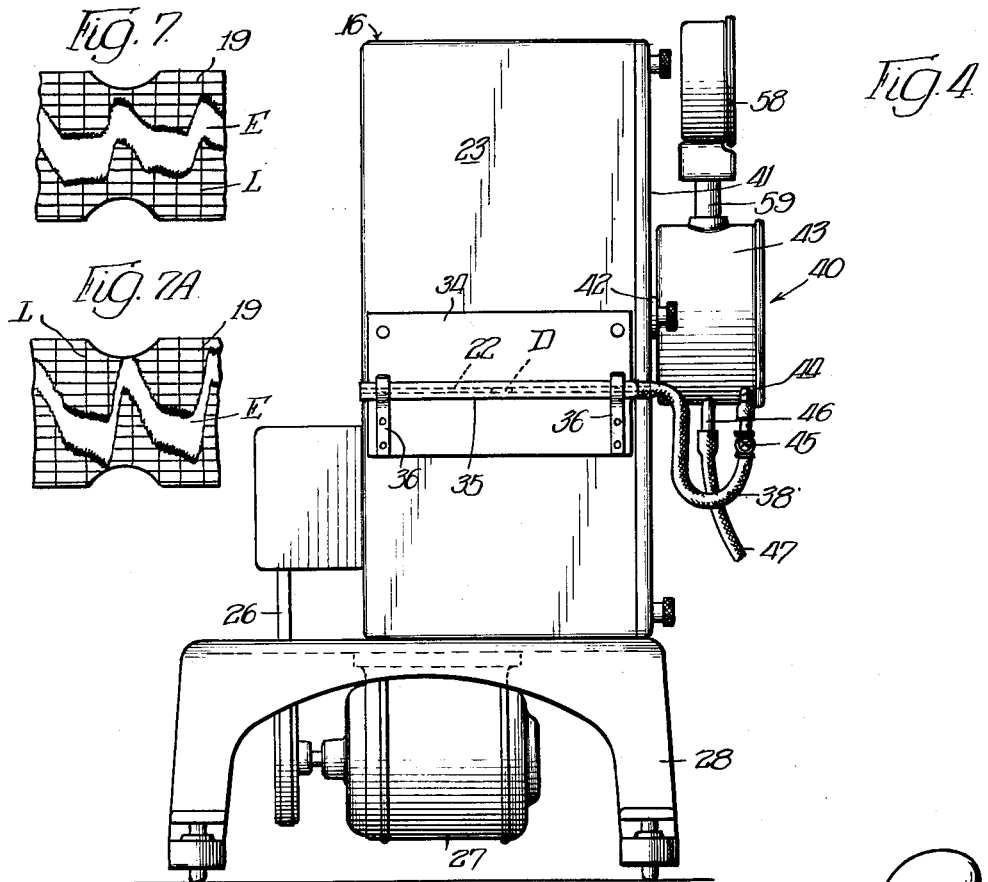
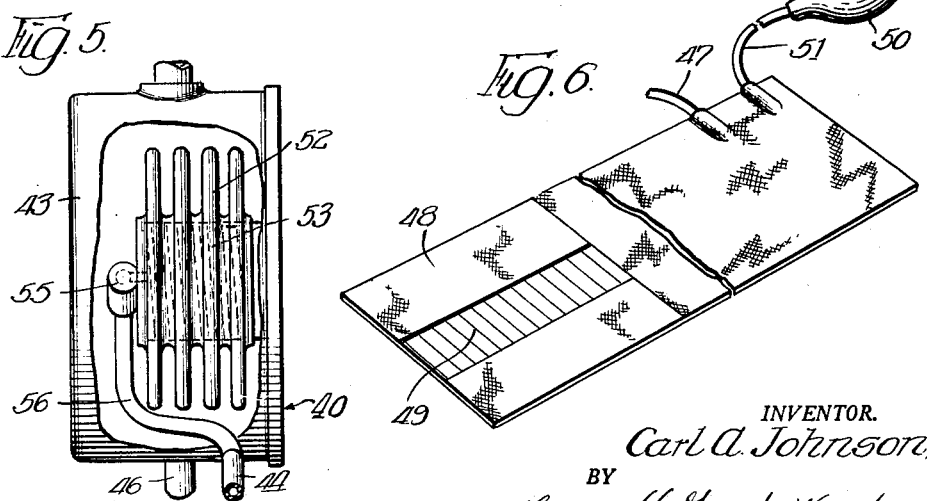
INVENTOR.
Carl A. Johnson,
BY Patented Apr. 14, 1953

2,634,611

UNITED STATES PATENT OFFICE 2,634,611

ATTACHMENT FOR VASCULAR RECORDING APPARATUS

Carl A. Johnson, Chicago, Ill., assignor to W. M. Welch Manufacturing Company, Chicago, Ill., a corporation of Illinois Application May 21, 1949, Serial No. 94,668

2 Claims. (Cl. 73—410)

The present invention pertains to an attachment or adapter unit for scientific recording apparatus. It is particularly intended for application to a graphic recording instrument of the oscillometer type for the purpose of extending the utility of such instrument in the observance or recording of blood vessel changes which are identified with the heart beat.

The oscillometer is an instrument for measuring oscillations of any kind especially the changes in the volume of pulsations in the arteries. The instruments are used for various purposes and are designated by various names according to their use, such as the "Henderson cardiometer" for use on the heart, the "oncometer" for use on the spleen and kidneys, and the "digital plethysmograph." They are used to measure slow volume changes such as occur with vasoconstriction or dilatation, and those rapidly induced such as are associated with the heart beat as measured by the Henderson cardiometer or by the digital plethysmograph. The digital oscillometer, selected for purpose of illustration in the present application is employed in recording rapid vascular changes such as are manifested by the fingers or toes; and it is in association with the digital oscillometer that the present attachment has special, though not exclusive utility.

In the ordinary use of the digital oscillometer a small, glass pressure vessel is applied in pressure sealing relation to a toe or finger of the patient or subject, and variations in the pressure within said vessel which are induced by pulse-created changes in cross sectional area of the digit are transmitted from said vessel through a flexible tube to a small, horizontally disposed, open-ended transparent tube. This tube has an extremely small bore in which a droplet of 95% alcohol is placed, the exterior of the tube being appropriately graduated. Thus variations in pressure within the pressure sealing vessel induce corresponding horizontal movements of the droplet in the tube. By disposing said tube before a photographic film, a beam projected from a light source onto the tube and droplet therein can be made to reproduce on said film a calibrated pulsating wave representing the pulse-induced volume changes in the blood vessel of the digit, which changes are in turn reflected by the movement of the droplet. This record is of value in the diagnosis of circulatory conditions or other conditions influencing the blood flow in the system.

It is apparent that the digital blood vessel changes on which the operation of the above type of oscillometer is based, i. e., the pressure changes which impart the alternating movement to the alcohol droplet are of very small amplitude. Since the fluctuations in blood vessel volume of flow at a larger cross section of the body, for example the arm or leg, are much greater in degree, it is equally obvious that the much more violent or pronounced variations in pressure are involved at such a member. If transmitted to the above type of oscillometer, for example by means of an inflatable cuff, they would only have the effect of blowing the droplet out of the end opening of the transparent tube of the instrument.

It is desirable to expand the range of adaptability of the digital oscillometer by adapting the same for the observation and recording of circulatory changes in parts of the body other than the digits and to extend and improve the sensitivity and accuracy of that and other types of instrument, as well as their adaptability; hence the attachment of the present invention has been devised. Although illustrated and described with reference to its preferred application to the oscillometer, it is to be understood that the attachment is also applicable to other related types of instruments, as will be described.

It is an object of the invention to provide an attachment for a scientific recording instrument or apparatus, for example one adapted to record graphically and continuously the heart or vascular condition of a patient or subject, whereby to substantially expand the field of use of said instrument by adapting it for additional types of analysis.

It is another object of the invention to provide an attachment of the above sort which, when used in conjunction with an oscillometer or other type of recording instrument, reproduces in accurate, full scale, and with uniform and improved sensitivity throughout its entire range of operation, a graphic representation of a physical condition at the heart or blood vessels.

Yet another object is to provide an attachment of the sort referred to in the preceding paragraph in which the representation produced with the aid of the attachment may be employed to study or diagnose a condition other than the condition said instrument was originally devised to record.

A still further object is to provide an attachment of the type referred to which can be readily applied to and removed from the instrument in question in a minimum of time and without alteration of said instrument.

The foregoing statements are indicative in a general way of the nature of the invention, but other and more specific objects will be apparent to those skilled in the art upon a full understanding of the construction and operation of the device.

A single embodiment of the invention is presented herein for purpose of illustration, but it will be appreciated that the invention is susceptible of incorporation in other modified forms coming equally within the scope of the appended claims.

In the drawings,

Fig. 1 is a view in side elevation illustrating the attachment of the present invention as operatively applied to a well known type of digital oscillometer, the latter including a light source for projecting a beam on a moving photographic strip within the oscillometer casing, a rotary timer employed to produce predetermined time subdivisions or ordinates on said strip, and the main recording unit of the oscillometer, to the casing of which the attachment is physically applied;

Fig. 2 is an enlarged view in side elevation of the aforesaid unit, with a side plate thereof removed, illustrating the arrangement of the film reel mounting and advancing elements thereof, and also showing the relationship of the characteristic tube of the oscillometer to the film exposure aperture of its casing;

Fig. 3 is a view, taken approximately from line 3—3 of Fig. 1, illustrating the operating relationship of the timer to the main oscillometer unit;

Fig. 4 is a view in front elevation of the oscillometer unit with the attachment of the present invention applied thereto;

Fig. 5 is a fragmentary side view of the attachment of the invention, partially broken away to more clearly show the internal structure of said attachment;

Fig. 6 is a fragmentary perspective view illustrating a type of inflatable sphygmometric cuff which is employed in conjunction with the oscillometer and attachment in accordance with the invention; and Figs. 7 and 7A are reproductions of portions of typical continuous photographic record strips produced when the attachment is used in conjunction with an existing digital oscillometer, showing pulsations as derived with the aforesaid inflatable cuff applied to a patient's limb, at different pressures of the cuff.

As indicated above, the present attachment has a special utility when used in conjunction with a digital oscillometer in that it substantially extends the field of use of that type of instrument, adapting it to the observance and recording of blood flow changes in the arm or leg, in addition to the digital analysis for which it is designed. However, when used in association with other types of apparatus the attachment presents a similar advantage and furthermore affords a photographic recording of a condition under observation which is reliable and accurate, since the attachment is uniformly sensitive in its recording over its entire range of operation. As an example, it may be employed in conjunction with the electrocardiograph for the purpose of recording on the electrocardiograph record strip a pulse-induced wave, either alone and independently of the wave derived through the usual electrodes of the apparatus, or its recording may be made in addition to the usual electrocardiograph recording. A convenient connection to receive the pressure tube of the attachment, when employed in this fashion, is that normally provided on the electrocardiograph apparatus to receive the standard apex beat recorder. Other adaptations of the attachment will suggest themselves to those skilled in the art.

Referring to the drawings, the reference numeral 10 generally designates a digital oscillometer of known type, the reference numeral 11 designates a suitable light source for projecting a beam onto the moving photographic strip of said oscillometer, to be hereinafter referred to, and the reference numeral 12 designates a simple blade-type rotary timing device which may be employed in the operation of the present system, if desired. It is the function of the device 12 to interrupt the beam emanating from the light source 11 at equal intervals of predetermined frequency, thereby to produce on the advancing photographic strip of the oscillometer 10 a series of time interval marks or ordinates. These facilitate the interpretation of the continuous photographic record of blood vessel change which is to be reproduced on said strip. Device 12 consists of the blade 13 attached to the shaft of a small inexpensive, low speed motor 14 which is mounted at proper height on a base 15. Motor 14 is electrically energized from a suitable source (not shown).

The oscillometer unit 10, as illustrated in Figs. 1, 2 and 4, comprises a lighttight casing 16 having a frictionally restrained film supply reel 17 suitably supported on a transverse shaft 18, about which the undeveloped film strip 19 is wound. Said strip is led for exposure about a platen or backing roller 20 suitably supported on a bracket 21 within the casing. This roller is located immediately behind a laterally elongated light opening or slit-like aperture 22 which extends horizontally across the forward wall 23 of said casing. From the platen roller 20, the film strip 19 passes between upper and lower feed rolls 24, 25 respectively, of which the former is driven by a chain 26 from a small electric motor 27 depending beneath the base or standard 28 of the oscillometer casing 16.

The strip 19 is advanced by rollers 24, 25 between fixed, vertically spaced, inclined guides 29, 30 into a rear film receiving housing 31, in which it is passed around a receiving reel 32. The latter is appropriately controlled by means not germane to the present invention to prevent jamming of the film. Housing 31 may be removed from the rear of casing 16 for the film development and printing operations, after severance of the exposed length from the strip 19 by means not necessary to illustrate or describe.

Referring to Figs. 2 and 4, the front wall 23 of the casing 16 has a pair of rectangular plates 34 applied thereon forwardly of and above and below the horizontal slit 22, as illustrated in Fig. 4. The space between said plates provides a recess for the reception of the small, horizontally disposed, transparent glass tube 35, the latter being held in place before the aperture or slit 22 (shown exaggerated in size for the purpose of clarity) by means of a pair of spring clips 36 carried by one of said plates.

The tube 35, which may be graduated if desired, has an internal bore of very small diameter, exaggerated in size in Fig. 2, said bore opening through the left-hand end of the tube, as viewed in Fig. 4. A droplet D of 95% alcohol is introduced into this open end of the transparent tube, alcohol being preferred over water because of its lower specific gravity viscosity and surface tension. Moreover, its motion is not impeded by the film of grease which tends to collect in the tube when water is employed. Care is taken to position this droplet approximately midway of the length of the slit 22 of the oscillometer casing 16.

The opposite end of the tube 35 has a flexible rubber pressure tube 38 applied thereto, as illustrated in Figs. 1 and 4. This tube 38, in the normal application of the oscillometer to digital diagnosis, is connected to a small glass vessel or cup adapted to be applied in sealed relation to the finger or toe of the patient.

In accordance with standard procedure, the light source 11 is arranged so that, after passing through the unfilled tube 35, its beam focuses somewhat behind the photographic strip overlying roller 20. When the alcohol droplet D is introduced into the tube the beam focuses on the sensitive strip and thus produces a sharp black image edged or surrounded by a gray background.

In accordance with the present invention, the pressure tube 38 is connected to the subject attachment which is generally designated by the reference numeral 40, instead of to a digitally applied pressure vessel. The photographic recordings, illustrated in Figs. 7 and 7A, are represented as negatives which result from use of the attachment. They are of the same general character as those produced in the normal use of the digital oscillometer, notwithstanding the fact that they are derived at a much larger member than a finger or toe. Specifically, in the typical example of Figs. 7 and 7A, the reading is derived at a point above the knee of the patient, Fig. 7 representing a recording with a cuff pressure of 170 mm. of mercury and Fig. 7A a reading at 140 mm. pressure.

In use, the attachment 40 is affixed to the side wall 41 of the oscillometer casing 16, represented by the removable side cover plate of said casing. A mounting bracket 42 secured to the rear of the housing 43 of the attachment is employed for this purpose. Said housing 43 is cylindrical and drum-like in shape, being provided with a radially projecting nipple 44 to which the pressure tube 38 is frictionally applied. It is desirable to insert a manually actuable cutoff valve or cock 45 in said tube 38 immediately in advance of its connection to the nipple 44.

A further radially projecting nipple 46 on housing 43 serves to communicate the latter, through a flexible rubber tube 47, with an inflatable sphygmometric cuff 48 of generally well known type, illustrated in Fig. 6. This cuff is reinforced by metal ribs 49 and is of a suitable length enabling it to be wrapped several turns about an arm or leg of the patient. It is inflated in a known fashion, when so applied, by means of the inflating bulb 50 and connecting tube 51. These details are familiar to those skilled in the art, it being appreciated that when the cuff is applied to the limb of the subject and inflated the variations in volume of blood flow in the limb are transmitted as pressure variations to the interior of the housing 43 of attachment 40.

Said pressure variations are effective upon the exterior of a flexible, sealed, corrugated metal bellows 52 or other equivalent diaphragm-like member located in the housing. The bellows 52 is rigidly affixed at one side thereof to the housing and is provided with an internal coil spring 53 acting to expand the bellows in the axial direction. It is thus evident that the pulsating pressure within housing 43 and externally of bellows 52 will compress the latter upon a pressure increase reflecting a blood pressure surge, and that the spring 53 will restore the bellows toward expanded position during the succeeding pressure drop. In short, a condition of pulsating pressure is set-up internally of the bellows which accurately represents the variations in blood vessel cross section, but in which the pulsations are of lesser amplitude than if directly derived. These internal pressure variations are transmitted from the interior of the bellows through a fitting 55 at one end thereof, thence through a connecting tube 56 to the nipple 44 of the housing 43, thence through the flexible pressure tube 38 to the transparent tube 35.

Accordingly, the relatively violent changes in pressure which are induced by the pulse variations at a limb of comparatively large cross section, such as the arm or leg, are so stepped down that they can be made effective on the extremely small bore of the tube 35. The result is that the pressure responsive, back and forth movements of the liquid droplet D in the latter are kept sufficiently restricted in scope that said droplet is retained within the tube. A beam of light from the source 11 projected onto the tube and droplet D thus reproduces on the moving photographic film 19 in the oscillometer casing 16 the wave form or envelope E depicted in Figs. 7 and 7A which accurately reflects the pulse condition of the patient at the limb in question. The graduations on tube 35 merely intercept the light beam and appear on the exposed, developed strip 19 as the white horizontal lines L of Figs. 7 and 7A. Records of this sort may be made at several points along the leg or arm as a valuable aid in diagnosing the condition of the patient.

A suitable gauge 58 is applied to the casing 43 of the attachment, using a flexible connector 59, for the purpose of ascertaining the degree of pressure built up in the inflated cuff 48, therefor existing within the housing 43.

The attachment adds materially to the scope and adaptability of the oscillometer type of instrument; it correspondingly enlarges the versatility of other, related types of recording instruments, for example the Cambridge type electrocardiograph, when applied thereto, as by connecting the flexible tube 38 to the existing connection for the apex beat recorder. However, the attachment has special adaptability to the extremely sensitive oscillometer in the successful and reliable recording of comparatively violent pulse manifestations accurately, in full scale, and with unvarying sensitivity throughout its range on an advancing photographic strip.

Moreover, no appreciable mechanical alteration change in the recording apparatus is required and the changeover can be made from digital analysis to recording by attachment in a very short time. A simple adjustment suffices to enable the photographic image or representation produced by the moving droplet D to exactly equal in its movements the changes in cross sectional blood vessel area which are manifested at the inflatable cuff 48.

The specific uses of the apparatus are many. It is suitable in the field of physiology to study the normal circulation in man and lower animal and the effect thereon of various factors such as environment, exercise, fatigue temperature, etc. In pharmacology, it is useful in studying the effect of drugs on the circulation. In medicine it is useful in the study of the pulse in connection with diseases of the heart and circulatory system, the effects of drugs in normal and diseased states, etc. Other adaptations in non-medical fields, for example as a lie detector, also suggest themselves. I therefore desire that the invention be construed no more restrictedly than is consistent with the following claims.

I claim:

1. Apparatus for measuring blood pressure changes and the like, comprising a fixed hollow transparent tube having a movable fluid pressure responsive element therein, an attachment comprising a hollow air-filled housing, means to communicate pulse-induced pressure variations to the interior of said housing, a flexible air-filled diaphragm member in said housing in sealed relation thereto and to said communicating means, said diaphragm member being elastically biased against the pressure in said housing and being movable in response to variations in air pressure within said housing and on one side of said diaphragm, and an air pressure transmitting element in communication with the other side of said diaphragm member and connected to an end of said transparent tube to shift said first named element in accordance with the air pressure variations on said last named side of said diaphragm member.

2. Apparatus in accordance with claim 1, in which said tube is open at the end thereof remote from said pressure transmitting element and said diaphragm is of corrugated bellows-like outline.

CARL A. JOHNSON.

References Cited in the file of this patent

UNITED STATES PATENTS

| Number | Name | Date |
|---|---|---|
| 1,283,085 | Cole | Oct. 29, 1918 |
| 2,203,460 | Fieber | June 4, 1940 |
| 2,478,372 | Colegrave et al. | Aug. 9, 1949 |

FOREIGN PATENTS

| Number | Country | Date |
|---|---|---|
| 264,873 | Great Britain | June 23, 1927 |
| 853,008 | France | Nov. 18, 1939 |